UNITED STATES PATENT OFFICE 2,594,537

RESINOUS PRODUCTS FROM AROMATIC POLYKETONES AND POLYAMIDES

Herman S. Bloch, Chicago, and Ralph B. Thompson, Riverside, Ill., assignors to Universal Oil Products Company, Chicago, Ill., a corporation of Delaware No Drawing. Application October 26, 1946, Serial No. 706,067

7 Claims. (Cl. 260—65)

The present invention relates to a process for the production of resinous materials useful in many arts as components of coating compositions, as raw materials in the formation of moldable plastic-like objects, and for other uses common to resins of the present type. More particularly, the invention concerns a new class of product characterized as a thermosetting type of resinous material formed by reacting an aromatic polyketone and a polyamide at conditions resulting in the liberation of water as a by-product of the reaction and the condensation of the reactants to form said resin.

The formation of the present resinous condensation product is ordinarily effected in the absence of any recognized catalytic agent for increasing the speed of reaction or for increasing the yield of resinous products. One object of this invention therefore, is to prepare a thermal setting resinous material by means of a simple condensation reaction between an aromatic polyketone and a polyamide in the absence of any added catalytic agent, thereby eliminating the necessity of removing or recovering catalytic material from the finished resinous product following the reaction in which the resin is formed.

In one specific application of the present process, an aromatic diketone is condensed with a polyamide of a carboxylic acid at a reaction temperature resulting in the formation of a hard brittle thermosetting resinous condensation product having a high melting point and a glossy surface.

In a more specific embodiment of the invention an aromatic diketone is heated with an equimolecular proportion of an aliphatic diamide of a dicarboxylic acid at a temperature within the range of from about 100° to about 350° C. until about one molecular proportion of water has been eliminated from the reaction mixture per ketone group used, forming as the result of the reaction a thermosetting resinous condensation product.

Other embodiments of the invention relating to specific reactants and to definite means of conducting the reaction, will be treated in the following further description of the invention.

In accordance with the present process, we have discovered that aromatic polyketones, wherein the keto groups are attached either to an aryl nucleus or to a carbon atom in a side chain attached to the aryl nucleus, may be condensed with a polyamide of either aliphatic, aromatic, naphthenic, or heterocyclic structure to yield a thermosetting resinous condensation product which may vary in hardness from soft pliable masses to hard brittle solids (depending on the extent of reaction) and which normally have clear, transparent properties. Moreover, we have discovered that the polyamide reactant may be selected from the generally large group of carboxylic acid amides or from the amides comprising the group referred to as the thio acid amides, the properties of the resinous product varying in accordance with the particular class of reactant selected.

The reaction mechanism, by means of which the present resinous products are believed to be formed, presumably involves the condensation of one or both of the hydrogen atoms of the amido group with the keto oxygen atoms of the aromatic polyketone reactant forming water and the resinous condensation products herein provided. Under some conditions and in the case of certain amides capable of self condensation to yield the biuret type of linkage, ammonia is liberated during the reaction. This permits the possibility of forming not only the —C=N— linkages by the condensation of a keto group and an amido group, but the biuret type of linkage:

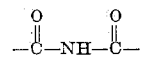

as well (the latter being formed by the condensation of two —NH₂ groups with ammonia as by-product of the reaction) and in addition, the

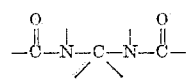

linkage by reaction of a ketone group with two amido groups. In any given resinous product formed by the reaction of an aromatic polyketone and a poly carboxylic acid amide, there may appear one or more monomer condensate units having the structure illustrated in the following formulation:

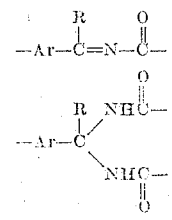

or $$-Ar-\overset{R}{\underset{|}{C}}=N-\overset{O}{\underset{\|}{C}}-(CH_2)_n-\overset{O}{\underset{\|}{C}}-N=\overset{R}{\underset{|}{C}}-$$

wherein R may represent an alkyl, aryl, alkenyl, or alicyclic radical, Ar represents an aromatic nucleus, hereinafter more fully characterized, and $n$ represents zero or a whole number, depending upon the molecular weight of the polyamide reactant. Usually, all three types of the above molecular arrangement are present in a given resinous product, the evidence for the formation of the biuret type of linkage being the formation of a small, but nevertheless distinct, quantity of ammonia during the reaction and the evidence for the condensation of one or both of the amido hydrogen atoms with the ketonic oxygen atom being the formation of one molecule of water for each ketonic group entering into the reaction. Similar types of monomer condensate units are believed to be formed in the condensation of thio acid amides with the aromatic polyketone reactant, although the products in the case of the latter class of amide reactant are not necessarily similar in physical and chemical properties to the resin obtained on condensation of a carboxylic acid amide and the aromatic polyketone reactant.

The reactant herein referred to as the aromatic polyketone, which when reacted with a polyamide forms the present resinous condensation product, is defined structurally as a compound containing an aromatic nucleus which is either mononuclear (that is benzenoid) in structure or polynuclear, the former being represented as derived from benzene and the latter being derived from such polynuclear aromatics as, for example, diphenyl, naphthalene, anthracene, phenanthrene, etc. Polyketones derived from heterocyclic aromatic compounds, such as for example, quinoline, coumarone, benzothiofuran, carbazole, and the like are also suitable. The aromatic polyketone is further characterized as being substituted on at least one of the nuclear positions of the aryl radical by an acyl group and/or a radical containing one or more keto groups, the total number of ketone groups contained in the aromatic polyketone being at least 2. The indicated aromatic polyketones may be represented by such compounds as o-, m-, p-diacetylbenzene, the various diacetyldiphenyls, o-, m-, or p-acetylbenzophenone, benzil, or benzil-like compounds wherein the keto groups are separated by an intervening alkyl group (as, for example, in dibenzoylmethane) and others of this class containing two or more keto groups or containing other radicals such as alkyl, alkenyl, aryl, amido, amino, halo, nitro, hydroxy, alkoxy, acyloxy, or sulfonic acid groups. Of the indicated utilizable derivatives, the aromatic polyketones containing one or more amide groups, preferably occupying a position in the molecule, at least 5 carbon atoms removed from the ketonic group thus substantially eliminating cyclization between said groups, are of special note, the latter compounds yielding resinous condensates with other polyamides and other aromatic polyketones having distinctive physical properties. The molecular weight and number of keto groups in the aromatic polyketone reactant determines the molecular weight of the resultant resinous condensation product. From our investigation of the present reaction, it has been deduced that any number of keto groups may be present in the aromatic polyketone, and its molecular weight is limited only by practical considerations such as its melting point which ordinarily must be sufficiently low to melt at the reaction temperature and mix with the other reactants.

The reactant herein specified as a polyamide, which when condensed with the aromatic polyketone, hereinabove characterized, at condensation reaction conditions forms the resinous product of this invention is selected from the group of amides whose amide radicals contain a thio acid group and/or a carboxylic acid group attached to the organic residue comprising said amide. The organic residue may contain saturated or unsaturated carbon-carbon linkages, may be either of branched, cyclic or straight chain configuration and may contain alkyl, alkenyl, hydroxy, keto, halo, nitro, aryl, etc. substituents attached thereto, the latter groups altering the physical and chemical properties of the ultimate resinous product as compared to the corresponding product obtained from a polyamide from which such substituents are absent. The organic residue may further be either heterocyclic or homocyclic in structure, represented, for example, by the homocyclic aryl or naphthenyl (cycloalkyl) radicals and the heterocyclic pyridine, pyrrole, etc. rings as well as cyclic amide condensation products, such as melamine. Further, the polyamide reactant may be represented by inter-molecular amide condensation products such as biuret or compounds containing the heretofore characterized biuret-type linkage.

Typical of the carboxylic acid polyamides utilizable herein include such compounds as urea, oxalic acid diamide, malonic acid diamide, citric acid triamide, etc. of the aliphatic series and phthalamide, m-(or iso-)phthalamide, p-(or tere-)phthalamide, and o-, m-, or p-, o'-, m'-, or p'-diphenyldicarboxylic acid diamide etc. of the aryl polyamides. The presence of unsaturated linkages within the organic residue of the polyamide reactant as well as the aromatic polyketone, such as compounds containing alkenyl and/or alkaldienyl groups, generally renders the resinous condensation product subject to further polymerization, as for example, at higher temperatures, and in general alters the physical properties of the resinous product.

The group of polyamide reactants containing a thio acid group corresponding to the carboxylic acid group of the above illustrated polyamides, may be of similar structure and molecular arrangement as the examples hereinabove given. Of the many types and classes of polyamides utilizable as reactants in the present process, it is characteristic of said poly acid amides that the amide nitrogen atom has attached thereto at least one and preferably two hydrogen atoms capable of condensation with the keto group of the aromatic polyketone reactant to form the resinous condensation product herein described. If mono-substituted amides are utilized as reactants, the substituents may be such radicals as alkyl, alkenyl, aryl, aralkyl or alicyclic groups which may be further substituted with groups such as hydroxy, carboxylic, nitro, hydroxy, etc. Linear polyamide condensation products made by the reaction of a diamine with a dibasic acid, by the self-condensation of amino acids or by reaction of an amino acid, a diamine and a dibasic acid are also suitable for reaction with polyketones. Thus protein materials and other naturally occurring condensation products of amino acids may be used, as well as synthetic polyamides such as those formed by the condensation of ω-amino-caproic acid or of hexamethylenediamine with adipic acid.

It is a further general requisite of the polyamide reactant that it melt at a temperature below the condensation reaction temperature hereinafter specified, thereby enabling the reactants to be intimately mixed while in a molten state and permit the respective amido and keto functional groups thereof to come into intermolecular contact and effect condensation of the reacting components. Alternatively, the reactants may be dissolved in a solvent which mutually dissolves each reactant and permits the requisite intermolecular contact of the amido and keto functional groups.

The condensation reaction involved in the present invention is effected at temperatures of from about 50° to about 350° C., the lower temperature limits of the above range being provided for reactants having low melting points, such as the low molecular weight polyamides and aromatic polyketones and for those reactants which condense readily at mild temperature conditions. In the case of the less reactive starting materials or those reactants having a high melting point, the mixture of reactants is desirably heated to temperatures within the upper limits of the above temperature range to effect condensation at a reasonably rapid rate. In some instances, especially in case one of the above classes of starting materials melts at a high temperature, it will be preferable to employ a low molecular weight compound for the other class of starting material. Thus, the low molecular weight reactant while in molten state dissolves the reactant melting at a high temperature and enables the establishment of contact between the reactant functional groups, thereby enhancing the completion of the reaction. Usually it is not necessary to employ superatmospheric pressures in carrying out the reaction except in the case of utilizing a low boiling reactant, when it becomes desirable to maintain the latter material in liquid phase during the reaction.

The proportion of reactants employed in the condensation will vary according to the type and number of amide groups and keto groups in each of the respective reactants. In the case of a polyamide reactant in which the amido groups of the amide are not substituted by non-condensible groups (that is, groups other than hydrogen such as alkyl or aryl), an equimolecular proportion of the aromatic polyketone will theoetically react with a given proportion of polyamide reactant in which the number of amide groups per molecule is the same as the number of keto groups in the aromatic polyketone. In the case of a polyamide reactant in which all of the amido nitrogen atoms are mono-substituted by a non-condensible group, such as an alkyl radical, the corresponding theoretical ratio of reactants is two molecular proportions of polyamide to each molecular proportion of aromatic polyketone if the number of amide groups per molecule of the former is the same as the number of ketone groups per molecule of the latter. Expressed in another manner, it may be said that a ketone group is mono-functional with respect to an amido group

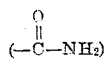

and bifunctional with respect to an alkyl-substituted amido group

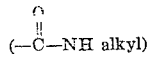

and the proportions of reactants are so adjusted that there are at least equifunctional amounts of ketone and amide, preferably up to about two reactive equivalents of said keto groups to said amido groups. In cases wherein a linear polyamide condensation product is caused to react with a ketone, however, even small amounts (as low as 1 to 10% or even less) of the ketonic material may be sufficient to convert the thermoplastic polyamide to a higher melting or even a thermosetting derivative, by the establishment of cross-linkages between the linear condensation chains.

It is within the scope of the present invention to effect the condensation reaction in the presence of a solvent which is miscible with the reactive starting materials and/or the resinous product. The solvent, when utilized, may be selected from the low molecular weight hydrocarbons such as hexane, benzene, petroleum ether, etc., an ether, such as dipropyl ether, dibutyl ether, etc. Preferably, a solvent which boils at a temperature above the reaction temperature required for the condensation reaction is selected, although in some instances, the solvent may be present in the reaction mixture for the express purpose of providing a refluxing medium which maintains the temperature of reaction at a constant value, the boiling point of the solvent. The solvent may also be expressly added to the reaction mixture to form an azeotrope with the water liberated during the condensation reaction, thus providing a means for removing the latter from the reaction product, either during the condensation reaction or following the formation of the product. In many cases it is desirable to employ the solvent as a diluent of the reactants so as to control the rate of reaction or the temperature developed in the reaction mixture. When such precautions are taken, the product usually has a more desirable color and its other physical properties, such as texture and hardness are improved.

After completion of the initial condensation reaction and the separation of the product thereof from the reaction mixture, the resin may be dried and pulverized into a finely divided condition suitable for subsequent molding operations, mixing into protective or covering compositions or for utilization in the manufacture of other compositions, such as plastics. In case an excess of either reactant is employed in the condensation reaction, or if the initial stage of the reaction is not allowed to proceed to complete condensation of the components, the reaction product separated from the initial stage of the condensation may be further reacted with additional quantities of either of the reactants to form thereby a product having properties differing from the initial or partial condensation product. Alternatively, the excess of reactant may be removed from the product by extraction with a suitable solvent, for example, one which is miscible with either the excess reactant or with the resinous product to effect thereby a separation of these components from the partial condensation product. The final stage of the reaction or completion of the condensation of the reactants present in the partially condensed product may be conducted in a heated mold or other shaping apparatus when desired. We have found that a convenient means for forming molded articles is to conduct the initial reaction to a stage of partial completion, forming thereby a soft resinous product which usually possesses thermo-plastic properties, and subsequently completing the reaction by heating the initial reaction product in the desired mold, thus forming the thermal setting resinous product of this invention which melts at a high temperature and in general is tougher, more brittle and has a greater gloss than the initial or partial condensation product.

Resinous products obtained in the present process have widespread utility in various arts, depending in large measure upon the physical properties of the product. The resins, for example, may be composited with various drying oils such as the glyceride type or unsaturated hydrocarbon type to form varnish and/or paint compositions, and when employed for said purposes, the resins contribute valuable film-forming and bodying properties to such compositions. The protective coatings prepared from the present resins form a glossy surface resistant to chemicals, water and abrasive agents and such compositions in which solid resins of this invention are incorporated dry to hard non-tacky films. In some cases, the products of this invention are useful as plasticizers, especially when the product is a semi-solid or viscous liquid resin. When solid resinous products are obtained, these may be melted or extruded into variously shaped articles or used to impregnate cellulosic materials such as paper or shaped wooden articles, or the resins may be heated with wood flour, wood chips, cotton linters, asbestos or other fibrous materials to form semi-rigid or rigid structural shapes.

The following examples are presented for purposes of illustrating the present invention, but the scope of the invention should not necessarily be restricted to the particular variables specified in said examples.

*Example I*

Equimolecular proportions of p-diacetylbenzene and urea were heated at a temperature of 235° C. for a period of one-half hour resulting in the formation of a resinous condensation product which is transparent and is red in color. As the reactants were heated, two phases appeared initially in the reaction vessel, each gradually vanishing as the temperature was increased to the above value. Water and a small quantity of ammonia were evolved during the heating operation.

*Example II*

Equimolecular proportions of p,p'-diacetyldiphenyl and urea react under the same conditions as specified in Example I to form a resinous condensation product having properties similar to the product obtained in Example I.

*Example III*

Equimolecular proportions of p-diacetylbenzene and azelaic acid diamide were mixed in finely divided condition and heated to a temperature of 285° C. to form a tough, dark red, resinous mass after a reaction period of approximately one-half hour.

*Example IV*

A dark red resinous condensation product was formed by reacting p,p'-diacetyldiphenyl with an equimolecular proportion of azelaic acid diamide by heating the above reactants at a temperature of about 285° C. The resin possesses thermosetting properties and exhibited considerable mechanical strength.

We claim as our invention:

1. A process for the production of a resinous material which comprises reacting at a temperature of from about 50° to about 300° C. a mixture of an aromatic polyketone having the structure of an aromatic hydrocarbon containing at least two nuclear acyl substituents per molecule, said acyl substituents being of the class characterized as hydrocarbon carbonyl groups, with a polyamide selected from the group consisting of urea, oxalic acid diamide, citric acid triamide and a hydrocarbon polycarboxamide in which the carboxamide radicals are all directly substituted on the same hydrocarbon radical, in which all of the amido nitrogen atoms are N-hydrogen substituted, and which apart from the carboxamide groupings —CON= consist of carbon and hydrogen, said mixture of polyketone and polyamide containing from 1 to 2 keto groups per two amide hydrogen atoms, the condensation of the keto and amido groups being the sole reaction involved in the formation of said resin.

2. The process of claim 1 further characterized in that said polycarboxamide is a diamide containing dihydrogen substituted amido groups and said polyketone is an aromatic diketone.

3. The process of claim 1 further characterized in that said polyamide is azelaic acid diamide.

4. The process of claim 1 further characterized in that said polyketone is diacetylbenzene.

5. A process for the production of a resinous material which comprises reacting equimolecular proportions of urea and diacetylbenzene at a temperature of from about 50° to about 350° C.

6. The product formed by the process of claim 1.

7. The product formed by the process of claim 5.

HERMAN S. BLOCH.
RALPH B. THOMPSON.

REFERENCES CITED

The following references are of record in the file of this patent:

UNITED STATES PATENTS

| Number | Name | Date |
|---|---|---|
| 2,179,239 | Willmanns et al. | Nov. 7, 1939 |
| 2,229,744 | Kern | Jan. 28, 1941 |
| 2,332,895 | D'Alelio | Oct. 26, 1943 |
| 2,332,897 | D'Alelio | Oct. 26, 1943 |
| 2,484,529 | Roedel | Oct. 11, 1949 |

OTHER REFERENCES

Grimaldi: Gazz. Chem. It., vol. 27, part I, 1897, pp. 228, 229, 230, 232, 235, 237, 238, 245, 246.

Biltz: Berichte Deut. Chem. Ges., vol. 41, 1908, pp. 1379, 1384, 1391.

Ssolonina Chemisches Central-Blatt, vol. 76, 1905, I, pp. 341, 342.

Hillmann, Hoppe-Seyler's Zeitschrift für Physiologische Chemie, vol. 277, pp. 222, 230.

Ruggli et al.: Helvetica Chimica Acta, vol. 19, 1936, pp. 962, 964, 971, 972.

Ruggli et al.: Helvetica Chimica Acta, vol. 22, 1939, pp. 496, 510.